United States Patent [19]
Lundquist

[11] 3,985,168
[45] Oct. 12, 1976

[54] ADJUSTABLE ROUTING TEMPLATE

[76] Inventor: Ray Arnold Lundquist, 2571 - 24th Ave. N., St. Petersburg, Fla. 33713

[22] Filed: Oct. 20, 1975

[21] Appl. No.: 623,942

[52] U.S. Cl. ................... 144/144.5 GT; 33/174 G; 33/DIG. 9; 144/134 R; 144/144 R
[51] Int. Cl.² ..................... B27C 5/00; B23Q 15/00
[58] Field of Search ..................... 90/DIG. 3, 12 D; 144/134 R, 134 A, 137, 144 R, 144 S, 136 R, 134 D; 33/174 G, DIG. 9

[56] References Cited
UNITED STATES PATENTS

| | | | |
|---|---|---|---|
| 2,652,866 | 9/1953 | Drain | 33/174 G X |
| 3,199,556 | 8/1965 | Wing | 144/144 S |
| 3,540,130 | 11/1970 | French | 144/144 S X |

*Primary Examiner*—Donald R. Schran
*Assistant Examiner*—W. D. Bray
*Attorney, Agent, or Firm*—Marden S. Gordon

[57] ABSTRACT

An adjustable routing template for use with a routing tool in a manner allowing a craftsman to rout a variety of ornamental grooves and recesses on work pieces such as cabinets, doors and the like, the template consisting of a set of four identical bars for legs which are slidingly interconnected at opposite end portions thereof to define a frame type configuration for engaging corner edges of the work piece with the frame overlapping and lying parallel to the work piece to provide rigid guide edges in adjusted spaced relationship to the work piece for guiding the router thereover. Guide members are readily received in corners defined by adjacent bars to provide for the routing of a variety of ornamental designs on the work piece.

7 Claims, 9 Drawing Figures

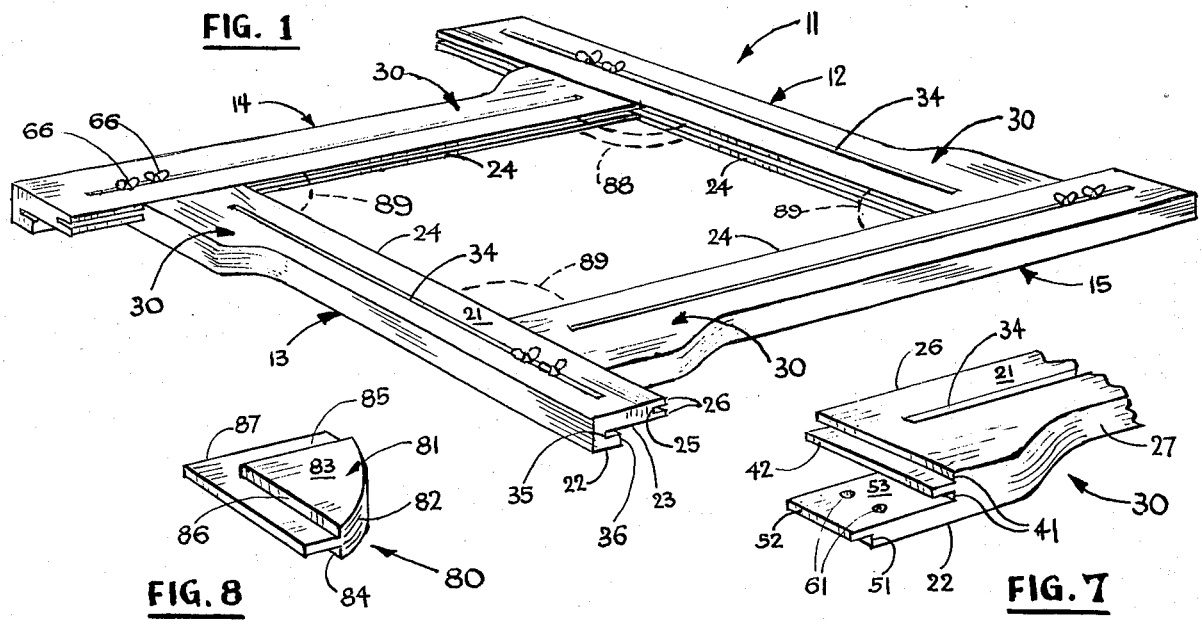

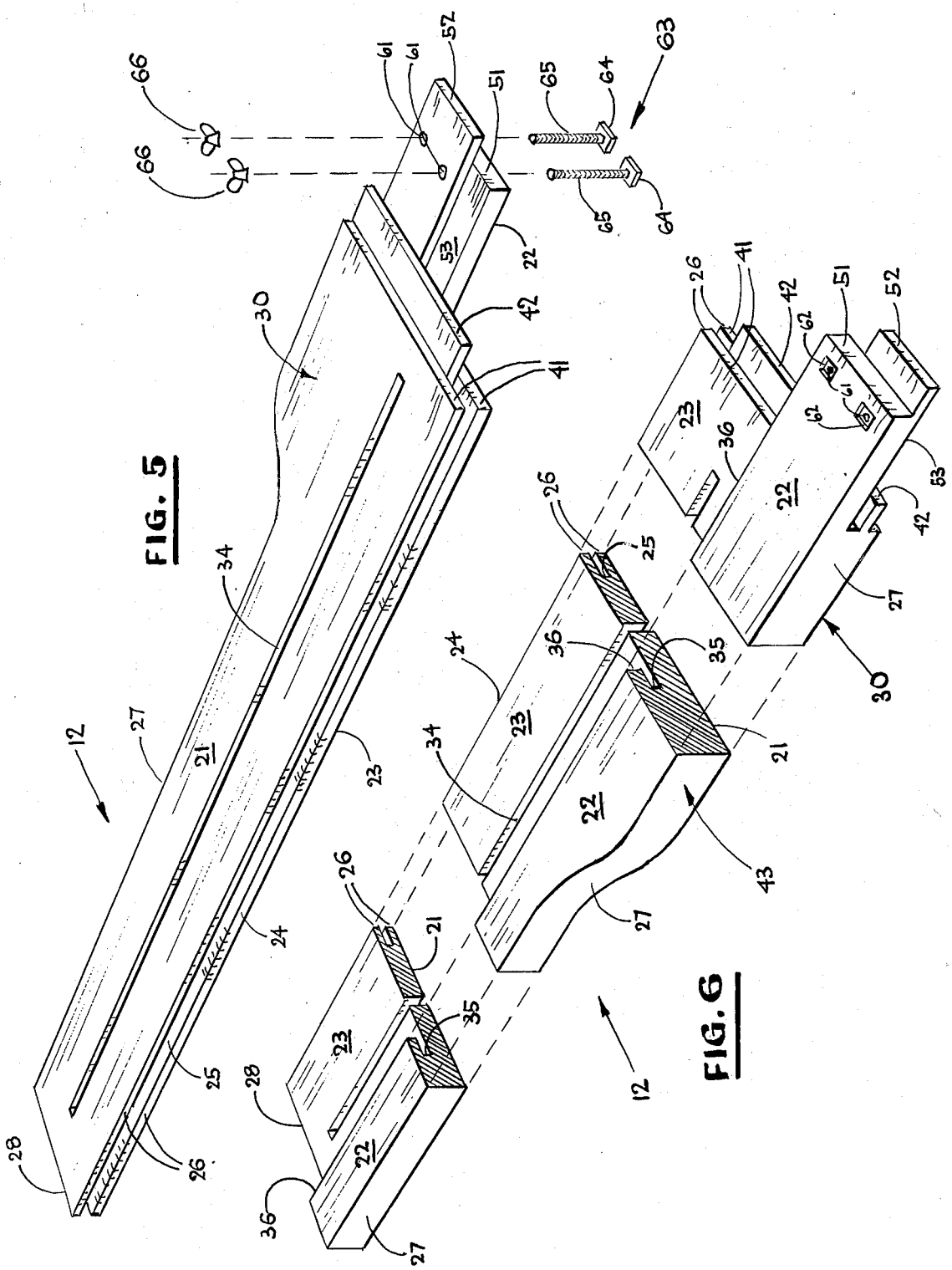

ADJUSTABLE ROUTING TEMPLATE

BACKGROUND OF THE INVENTION

1. Field of the Invention

This invention relates generally to tools and guide devices therefor and more particularly to a novel fully adjustable routing template to be placed over a work piece and providing guiding edges for a router to cut ornamental grooves, steps, ledges and the like in the work piece, such as in a cabinet door and the like.

2. Description of the Prior Art

The use of routers in custom cabinet work for the cutting of grooves, steps, recesses, ledges and the like in a decorative manner to provide a design on a work piece, such as a cabinet door and the like, has long been known in the art of woodworking. While such routers have great flexibility, it is often difficult to maintain the cutting bit of the router in a predetermined position as it is passed along the work being routed, and accordingly there has been developed in the prior art guide templates for use with the router for accurate guiding of the router over the work piece being routed. However, such prior art devices have involved rather complicated and fragile structure requiring special skills and knowledge as to the handling and care thereof.

Such prior art structures either require the use of a specific special template for each design being routed, or alternatively, are manufactured of a multiplicity of interconnected components requiring great care in the adjustment thereof to assure accurate alignment of the various components. A further disadvantage of such prior art adjustable type templates is that they do not lay flat on the work piece thus requiring special care in the use thereof as the central portions thereof tend to flex during use providing for uneven depth of the recess being routed.

Still a further disadvantage of such prior art routing templates is found in that guide members must be utilized therewith in order to provide for clearance of the router around adjusting brackets utilized to secure the various components together, as otherwise such brackets would interfere with the free movement of the router and cause distortions in the ornamental design being routed on the work piece.

Prior art devices thus suffer many problems and difficulties such that while they have somewhat improved the functionality of a router being utilized for the routing of an ornamental design on a cabinet door, they still fail to provide a completely adjustable and completely dependable routing template requiring no guide members if none are desired, one which is easy to use and dependable in operation, and one which is fully adjustable to fit square or rectangular panels or cabinet doors of various sizes in a quick and secure manner.

Summary of the Invention

The present invention remedies and overcomes all of the foregoing deficiencies and disadvantages of presently available routing templates by providing a novel fully adjustable routing template for use with any make of router to rapidly route out an ornamental design in a flat work piece, such as a cabinet door, with the template adjusting rapidly and accurately to fit any size of rectangular or square configuration in a manner providing rapid engagement of the template with the work piece in a secure manner to provide accurate guidance of the router thereover in an efficient and time saving manner.

The present invention provides a novel adjustable routing template which completely eliminates any need of manufacturing custom templates corresponding to the size and configuration of the flat work piece to be routed, this providing a great time and cost savings not presently available in the art.

Still further, the adjustable routing template of the present invention provides for the complete routing of a work piece without the need for re-setting or re-adjusting any parts of the template during the routing procedure.

It is a feature of the present invention to provide an adjustable routing template which is fully adjustable from the smallest imaginable square or rectangular configuration up to the maximum square or rectangular configuration limited only by the physical size of the actual dimensions of the routing template being utilized.

A further feature of the present invention provides an adjustable routing template which lays completely flat on the flat work piece being routed thus eliminating any possibility of deflection of the components of the template during the routing operation to thus assure the uniformity of the depth of the groove being routed throughout all portions of the work piece.

Still a further feature of the present invention provides for optional corner stops to be utilized with the adjustable routing template for engaging the corners of the work piece to hold the template securely thereto in a manner overlapping the surface to be routed, such corner stop members being provided in various sizes and configurations for selective location of the template relative to the corners of the work piece.

Yet still a further feature of the present invention provides an adjustable routing template which is easy to use and reliable and efficient in operation.

Still yet a further feature of the present invention provides an adjustable routing template which is of a rugged and durable design and construction and which, therefore, may be guaranteed by the manufacturer to withstand rough usage.

Yet still a further feature of the present invention provides an adjustable routing template which is relatively inexpensive to manufacture due to its simplicity of construction and which, therefore, may be readily manufactured at a relatively low cost by readily available manufacturing methods such that it can be retailed at a sufficiently low price to encourage widespread use and purchase thereof.

Other features and advantages of this invention will be apparent during the course of the following description.

Brief Description of the Drawings

In the accompanying drawings forming a part of this specification, and in which like reference characters are employed to designate like parts throughout the same:

FIG. 1 is a top perspective view of the adjustable routing template of the present invention;

FIG. 2 is a top plan view of the adjustable routing template of the present invention showing but two of the infinitely variable adjustments thereof;

FIG. 5 is a top perspective view of one of the bars or legs of the template;

FIG. 6 is a bottom perspective view of the bar or leg of FIG. 5 with it being illustrated as cut and spaced apart segments for the showing of design details thereof;

FIG. 7 is a top fragmentary perspective view of the head end portion of one of the bar or leg members of the invention;

FIG. 8 is a top perspective view of a guide member for use with the template.

DESCRIPTION OF THE PREFERRED EMBODIMENT

Figure 3:
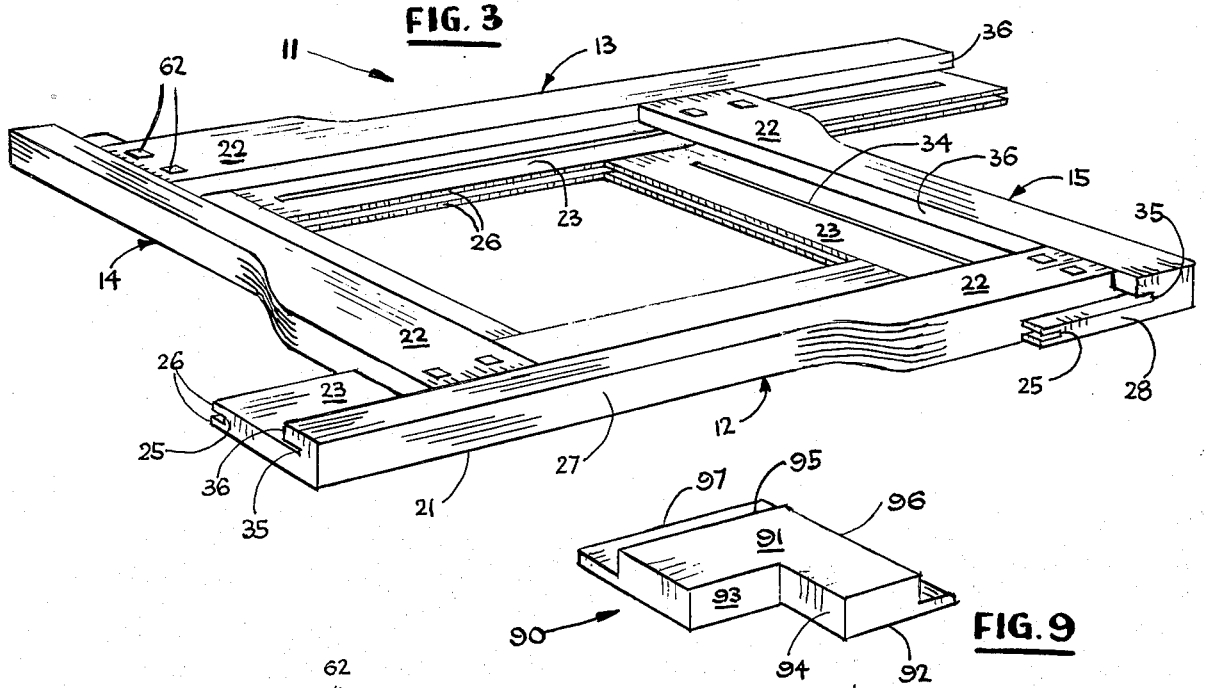
FIG. 3 is a bottom perspective view of the adjustable routing template of the present invention.

Referring now to the drawings in detail and in particular to FIGS. 1 to 7 inclusive, a preferred form of an adjustable routing template constructed in accordance with the principles of the present invention is designated generally in its entirety by the reference numeral 11 and is comprised of four identically constructed elongated bar or leg members 12, 13, 14 and 15. It is to be understood that the bar members 12, 13, 14 and 15 may be of differing lengths and determined during the manufacture thereof, with it being further understood that while only four bar members have been illustrated that it is envisioned that the principles of the present invention are applicable to a template having a different number of side forming bar members.

As each of the bar members 12, 13, 14 and 15 are identically constructed, and to avoid needless repetition of descriptive material, the following description pertains specifically to the bar member 12 as being typical of the construction of each of the remaining bar members 13, 14 and 15.

The bar member 12 is illustrated in greater detail in FIGS. 5 and 6. The bar member 12 is manufactured of flat elongated generally rectangular configured stock material such as metal, wood or any other suitable satisfactory material.

The bar member 12 consists of a flat horizontal top surface 21, a flat horizontal bottom surface 22, a flat downwardly facing horizontal surface 23 positioned intermediate surfaces 21 and 22 and extending parallel thereto, a flat vertically extending inside edge 24 which is bifurcated by an upper channel 25 extending centrally longitudinally therethrough defining a pair of upper guide surfaces 26, 26 which, in turn, define the inside flat edge 24. Further, bar member 12 has outer edge 27, foot end 28, and enlarged head forming end portion 30 which will be described in greater detail in later paragraphs.

As best seen in FIG. 6, flat bottom surface 22 terminates along an inner edge defining a lower guide surface 36 which extends parallel to upper guide surfaces 26 and spaced inwardly therefrom and projecting intermediate surfaces 22 and 23. A lower channel 35 is defined in lower guide surface 36 immediately adjacent downwardly facing surface 23, the channel extending the complete length of the lower guide surface between foot end 28 and head end 30. The upper and lower channels 25 and 35 are parallel to each other, with the upper and lower guide surfaces 26 and 36 being likewise parallel to each other.

Disposed centrally of bar member 12 and extending longitudinally therethrough is an adjustment slot 34 which extends completely through surfaces 21 and 23 and having its end portions terminating slightly inwardly of foot end 28 and head end 30 respectively.

As regards the enlarged head end portion 30 as seen in greater detail in FIGS. 5–7, there is provided a pair of upper guide edges 41 extending parallel and co-planar with each other in a direction normal to the inside edge 24, with an upper outwardly projecting tongue member 42 being disposed therebetween and projecting outwardly therefrom parallel to surfaces 21–23 inclusive and being of a thickness to be slidingly received in upper channel 25 of an adjacent bar member 15 when upper guide edges 41 slidingly engage the upper guide surfaces 26 of the adjacent bar member 15. Spaced outwardly from inner edge 24 a greater distance than the normal portion of outer edge 27 is offset portion 43 of the bar member 12, this offset portion extending outwardly beyond the edge of upper tongue 42 and terminating in a flat lower guide edge 51 which extends parallel to the upper guide edges 41. A flat upwardly facing surface 53 is provided which extends almost co-planar with flat downwardly facing surface 23 and which extends beyond the lower guide edge 51 to define a lower tongue member 52 which extends parallel to upper tongue member 42 and which is adapted to be slidingly received within lower channel 35 of adjacent bar member 15 upon surfaces 53 and 51 engaging surfaces 23 and 36 respectively of bar member 15 to be slidingly adjusted therealong. A pair of transversely aligned and spaced apart apertures 61, 61, extend through surfaces 22 and 53 adjacent lower guide edge 51 and spaced inwardly therefrom, the apertures terminating in rectangular sockets 62 disposed in surface 22. The apertures 61, 61 are positioned to be in vertical orientation with adjusting slot 34 of any of the other bar members, such as bar member 15 such that when the bar members 12–15 are placed together in the manner as illustrated in FIGS. 1–4, then a pair of bolts 63 having square heads 64 and threaded shanks 65 may be inserted through associated ones of the aperture 61 with bolt heads 64 being received in sockets 62 in a manner to prevent rotation of the bolts, and with a pair of wing nuts 66 threadedly received on the ends of the shanks 65 for securing adjacent ones of the bar members adjustably together.

In operation, and referring to FIG. 1, upper and lower parallel tongue members 42 and 52 of bar member 11 are slidingly received in upper and lower parallel channels 25 and 35 respectively of bar member 15 with upper and lower guide edges 41 and 51 of bar member 11 being placed in parallel adjacent juxtaposition with upper and lower guide surfaces 26 and 36 respectively of bar member 15. This places apertures 61 of bar member 11 in vertical orientation with adjusting slot 34 of bar member 15, with bolts 63 extending through the apertures and through the slot to be retained in position therein by wing nut 66. Bar member 11 is now freely adjustable relative to bar member 15, or alternatively, bar member 15 is adjustable relative to bar member 11 with the associated guiding surfaces and edges along with associated tongue members and channels providing for accurate guided movement maintaining the two interconnected bar members at a ninety degree angle relative to each other at all times, with wing nut 66 in association with bolt 63 providing for the locking of the two interconnected bar members together at the selected adjusted position and retaining such selected adjusted position until after the wing nuts are loosened to permit different adjustment of the bar members relative to each other.

As all of the bar members 12–15 are identically constructed, it is to be understood that they are readily interconnected in the manner as aforedescribed relative to each other, this being as clearly illustrated in the drawings in that any of the bar members will accept any of the other bar members to be slidingly affixed thereto. In this regard, it is important to note that, when assembled, the adjustable routing template 11 as defined by the bar members 12–15 provides a flat co-planar bottom surface defined by the individual bottom surfaces 22 of the individual bar members, and a flat co-planar top surface defined by the individual top surfaces 21 of the individual bar members. This is important to the present invention in that it provides a smooth co-planar bottom surface for the template to be rested on the work piece, such as a cabinet door, with all portions of the bar members forming the template being in contact with the work piece to provide a firm support to the template. Further, the flat top surface provides for the accurate positioning of the router thereon, such as designated generally in FIG. 2 of the drawings by reference numeral 71 and having its guide or reference spindle and bit 72 disposed adjacent inside edge 24. Thus, the router 71 moves freely about the template 11 on the top surfaces 21.

Further, in this regard, the offset 43 of the bar member head end 30 is pointed out as to placement of the hole 61 and wing nuts 66 in a position spaced a distance outwardly from the inside edges 24 to permit the router 71 to be freely guided by the inside edges without encountering interference at the inside corners when the router freely passes by the wing nuts.

Referring now to FIG. 8, there is illustrated a sample guide member 80 having a pie shaped body member 81 with curved outer surface 82, flat top surface 83, flat bottom surface 84, flat interior edges 85 and 86 disposed at a ninety degree angle to each other, and an L-shaped tongue member 87 disposed centrally of edges 85 and 86 and projecting outwardly therefrom. Body member 81 has a thickness corresponding to the distance between surfaces 21 and 23 with tongue 87 adapted to be received in the inside corners defined by adjacent ones of the bar members 12–15, such as between bar member 12 and 14 as designated generally by reference numeral 88, with edges 85 and 86 engaging upper guide surfaces 26 and with surfaces 83 and 84 lying substantially co-planar with surfaces 21 and 23 respectively. The tongue 87 is of a thickness to be snugly received in the upper channel 25 for removably retaining the guide 80 in position in the corner between the adjacent bar members. Additional guide members 80 may be provided in all of the inside corners of the adjustable template 11, such being designated in dotted line configuration generally designated by reference numeral 89.

In this regard, while pie-shaped guide member 80 has been illustrated, it is to be understood that it is envisioned that guide members of various configurations and designs may be inserted into the corners between adjacent bar members in the same manner so as to provide for a wide variety of ornamental designs to be routed onto the work piece.

Referring to FIG. 2, there is illustrated but two of the infinite variety of adjustments of the bar members, a small rectangular configuration being illustrated in solid line configuration and with the dash line configuration illustrating a larger rectangular configuration obtainable with the template 11.

Figure 9:
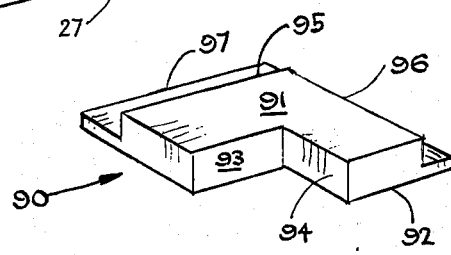
FIG. 9 is a bottom perspective view of a corner stop member for use with the template.

Referring now to FIG. 9, there is illustrated an L-shaped corner stop member 90 having a flat bottom surface 91, a flat top surface 92, interior L-shaped edges 93 and 94 disposed at a ninety degree angle relative to each other, an outside L-shaped edges 95 and 96 disposed at a ninety degree angle relative to each other, and an L-shaped flange member 97 lying co-planar with top surface 92 and extending outwardly from each of the exterior surfaces 95 and 96. The corner stop member 90 is intended to be removably inserted into the bottom-most corners of the template 11 between adjacent bar members, with flange 97 being snugly received in lower channel 35 of adjacent bar members by edges 95 and 96 engaging lower guide surfaces 36, and top surface 92 being in parallel juxtaposition with downwardly facing surface 23. When in position, bottom surface 91 will lie co-planar with the bottom surfaces 22 of the bar members 12–15.

Figure 4:
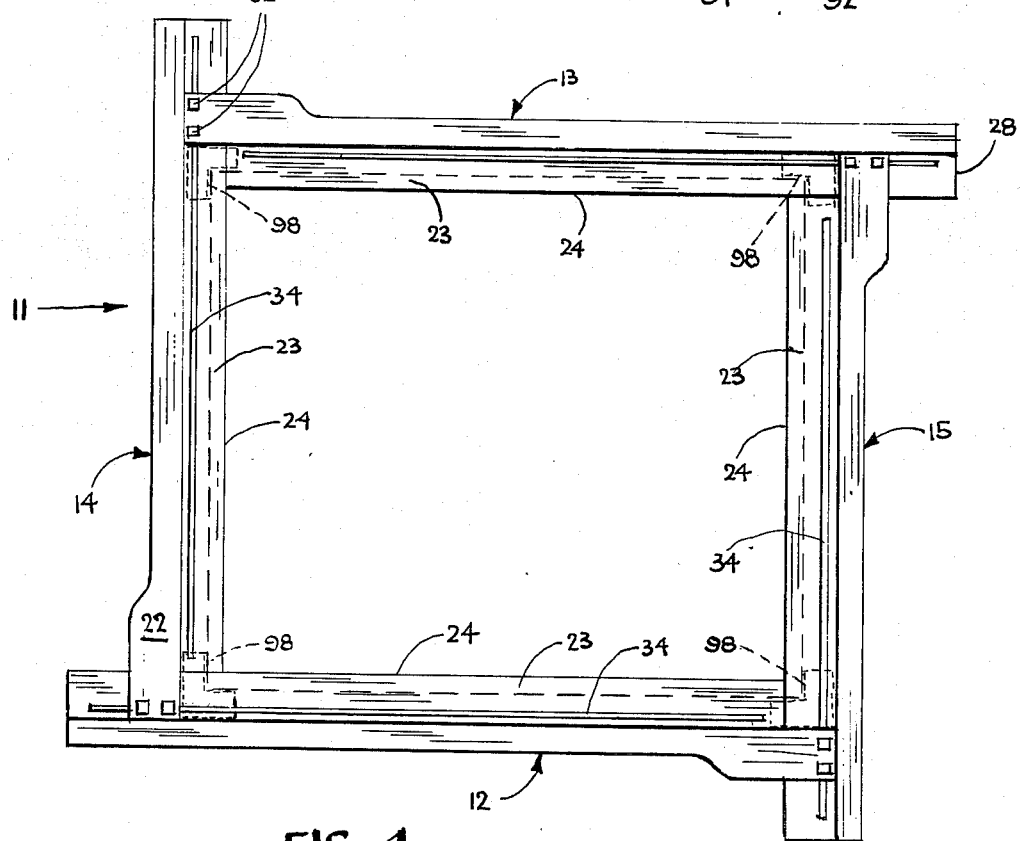
FIG. 4 is a bottom plan view of the adjustable routing template of the invention.

In operation, a stop member 90 is inserted into each of the bottom portions of the inside corners of the template, such as designated generally in dotted line relief by reference numerals 98 in FIG. 4. A work piece, such as a cabinet door, is then laid flat on a work table and the template 11 placed in an overlapping manner relative thereto with the stop members 90 each engaging a corner of the work piece by adjustment of the bar members 12–15 relative to each other as previously described. This now securely retains the template 11 to the work piece with the inner edges of the template being positioned and spaced inward relationship relative to the exterior edges of the work piece to define a rigid straight perimeter parallel to the outer edges of the work piece and in position to guide a router, such as router 71, thereabout for routing an ornamental design into the work piece.

In this regard, it is to be understood that the stop members 90 may be of various configurations and having different widths to accommodate work pieces, such as cabinet doors, of different sizes and configurations so as to permit a selective variety as to the desired inward spacing of the inner edge 24 of the template relative to the perimeter edge of the work piece being routed.

There is thus provided a novel adjustable routing template 11 fully adjustable to an infinite variety of rectangular and square configurations, and readily removably receiving therein both corner guide members, such as guide member 80, and corner stop members, such as stop member 90, for securing the template to the work piece being routed along with providing for a variety of designs to be routed onto the work piece without having to manufacture a custom template for each design to be routed.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size and arrangement of parts may be resorted to without departing from the spirit of the invention, the scope of the novel concepts thereof, or the scope of the sub-joined claims.

Having thus described the invention, what I claim is:

1. An adjustable routing template for use in guiding a cutting tool, such as a router, for the routing of grooves, steps, ledges and the like in a work piece, such as a cabinet door, the template comprising, in combination:
   a set of four substantially identically constructed longitudinally elongated rigid bar members;
   means associated with each of said bar members for adjustably slidably interconnecting adjacentmost ones of said bar members to define said templates;
   a plurality of corner guide members, each guide member removably insertable into a corner defined between adjacentmost bar members for defining ornamental configurations to be routed with the template; and
   a plurality of corner stop members, each stop member removably insertable into a corner of said template in a manner not interfering with the placement of said corner guide members, each stop member adapted to engage a corner of a work piece to be routed for securely mounting said template in an overlapping manner on said work piece with said corner stop members engaging corner portions of said work piece.

2. An adjustable routing template for use in guiding a cutting tool, such as a router, for the routing of grooves, steps, ledges and the like in a work piece, such as a cabinet door, the template comprising, in combination:
   a set of four substantially identically constructed longitudinally elongated rigid bar members;
   means associated with each of said bar members for adjustably slidably interconnecting adjacentmost ones of said bar members to define said templates;
   each of said bar members comprising, in combination:
   a flat elongated generally rectangular body member having a flat horizontal top surface, a flat horizontal bottom surface, a flat vertically extending inner edge, an outer edge, a flat foot end, and a head end portion;
   a flat downwardly facing horizontally extending surface extending the complete length of said body member parallel to said top and bottom surfaces and disposed therebetween;
   an upper channel extending centrally of said inner edge completely between said foot end and said head end thereof and dividing said inner edge into a pair of vertically spaced apart parallelly extending upper guide surfaces;
   a vertically disposed longitudinally extending lower guide surface extending parallel to said upper guide surface and interconnecting said bottom surface with said flat downwardly facing surface;
   a lower channel disposed longitudinally in said lower guide surface adjacentmost said flat downwardly facing surface extending parallel to said upper channel completely between said foot end and said head end of said body member;
   an adjustment slot extending longitudinally through said top surface terminating inwardly of said head end and said foot end thereof and in communication with said flat downwardly facing surface; and
   a head end portion associated with said head end projecting outwardly therefrom to be slidingly received in said channels and abutting said guide surfaces of an adjacentmost one of said bar members to which it is to be slidingly mounted.

3. The adjustable routing template as set forth in claim 2 wherein said head end portion comprises, in combination:
   a lip end extending vertically downwardly from said bar member top surface defining a pair of transversely extending parallel upper guide edges which extend normal to said inside flat edge of said bar member completely between said inside and said outside bar member edges;
   a flat horizontally disposed transversely extending outwardly projecting tongue member disposed intermediate said upper guide edges and extending completely therebetween, said upper tongue member being slidably received in said upper channel of an adjacent bar member upon said upper side edges being placed in sliding abutment with said upper guide surfaces of said adjacent bar member;
   an elongated rectangular flange projecting outwardly from said lip a distance greater than said upper tongue member having a bottom surface co-planar with said bar member bottom surface and having a flat upwardly facing surface formed almost co-planar with said flat downwardly facing surface, said flange member terminating in a lower tongue member extending transversely of said bar member parallel to said upper tongue member and of a size and thickness to be slidably received in said lower channel of an adjacent bar member;
   a transversely disposed vertically extending lip formed in said flange member inwardly of said lower tongue member extending parallel to said upper guide edges and defining a lower flat guide edge for sliding abutment with said lower guide surface of an adjacent bar member; and
   said flat upwardly facing surface being disposed in parallel abutting juxtaposition with said flat downwardly facing surface of an adjacent bar member when said head end portion is slidably received on said adjacent bar member.

4. The adjustable routing template as set forth in claim 3 wherein said means for adjustably slidably interconnecting said adjacent bar members comprises, in combination:
   a pair of transversely aligned and spaced apart apertures disposed in said head end portion flange member spaced inwardly of said lower guide edge and extending vertically through said flange member;
   a square shaped socket disposed concentric with each aperture in said flange bottom surface;
   a pair of bolts each having a square head and an elongated threaded shank, each bolt associated with one of said apertures and inserted therethrough with said square head received in said square socket to prevent rotation of said bolts while in said apertures;
   a pair of wing nuts, each wing nut associated with one of said bolts to be threadedly received thereon; and
   said apertures disposed in said flange member in a position to be placed in vertical orientation with said adjustment slot of an adjacent bar member when said head end portion is engaged with said adjacent bar member for slidable movement thereto.

5. The adjustable routing template as set forth in claim 4 further characterized by a plurality of substantially identical corner guide members, each guide member having a body member with a flat horizontal top surface, a flat horizontal bottom surface, an outer surface configuration, and a pair of inner vertically oriented edges disposed at a ninety degree angle relative to each other, the body member having a thickness between said top and bottom surfaces corresponding substantially to the thickness of said bar member as defined between said top surface and said flat downwardly facing surface thereof; an L-shaped flange disposed centrally about said body member exterior edges and projecting horizontally upwardly therefrom to be removably received in said upper channels of adjacent interconnected bar members for removably mounting said body member in the corner defined between adjacent inter-connected bar members; said corner guide members provided with a variety of exterior surfaces facing into the opening centrally of said template for use in guiding the routing tool thereabout to rout an ornamental design.

6. The adjustable routing template as set forth in claim 5 further characterized by a plurality of substantially identical corner stop members, each stop member being of an L-shaped configuration having a horizontal flat top surface and a horizontal flat bottom surface defining therebetween a thickness substantially identical to the thickness of said bar member as defined between said flat downwardly facing surface and said bottom surface; a pair of vertically disposed exterior edges each extending outwardly from each other at a ninety degree angle; a flange member having a general L-shaped configuration extending outwardly from each of said exterior side edges co-planar with said top surface and having a thickness adapted to be removably inserted into said lower channel of said bar member where said bar members are inter-connected; and a pair of interior vertically disposed edges extending at ninety degrees to each other adapted to engage corners of a work piece on which the template is to be utilized for securing the template to the work piece; said corner stop members being removably mountable to said inside corners of said template as defined by inter-connecting bar members without interfering with the removably mounted corner guide members similarly mounted in corners of said template as defined by said inter-connecting bar members.

7. The adjustable routing template as set forth in claim 6 further characterized by said top surfaces of said bar members lying co-planar with each other when assembled into said template; and wherein said bottom surfaces of each of said bar members lies co-planar with each other parallel to said top surfaces to define a smooth completely flat surface readily rested on a work piece to be routed with the complete length of said bar members being over-lapped on said work piece and fully supported along their complete length thereon.

* * * * *